(12) United States Patent
Kunka et al.

(10) Patent No.: US 9,876,415 B2
(45) Date of Patent: Jan. 23, 2018

(54) TOOL AND A METHOD FOR THE ASSEMBLY OF A GENERATOR

(71) Applicant: ALSTOM Technology Ltd, Baden (CH)

(72) Inventors: Grzegorz Jakub Kunka, Krosno (PL); Robert Fogel, Wroclaw (PL); Daniel Hediger, Othmarsingen (CH)

(*) Notice: Subject to any disclaimer, the term of this patent is extended or adjusted under 35 U.S.C. 154(b) by 223 days.

(21) Appl. No.: 14/657,251

(22) Filed: Mar. 13, 2015

(65) Prior Publication Data

US 2015/0263594 A1 Sep. 17, 2015

(30) Foreign Application Priority Data

Mar. 17, 2014 (EP) ..................... 14160295

(51) Int. Cl.
| | | |
|---|---|---|
| *H01S 4/00* | (2006.01) | |
| *H02K 15/14* | (2006.01) | |
| *H02K 5/14* | (2006.01) | |
| *H02K 5/04* | (2006.01) | |

(52) U.S. Cl.
CPC .............. *H02K 15/14* (2013.01); *H02K 5/14* (2013.01); *H02K 5/04* (2013.01); *Y10T 29/49009* (2015.01); *Y10T 29/53143* (2015.01)

(58) Field of Classification Search
CPC ............ H02K 5/04; H02K 5/14; H02K 15/14
See application file for complete search history.

(56) References Cited

U.S. PATENT DOCUMENTS

| | | | |
|---|---|---|---|
| 6,098,263 A | 8/2000 | Subler et al. | |
| 6,773,338 B2* | 8/2004 | Yun .......................... | B24B 49/04 451/285 |
| 7,742,249 B2* | 6/2010 | Lin ...................... | G02B 26/008 353/84 |
| 8,847,125 B2* | 9/2014 | Tseng ..................... | H05B 3/023 204/298.12 |
| 9,303,527 B2* | 4/2016 | Lin ......................... | F03D 80/60 |
| 2006/0257202 A1 | 11/2006 | Bexten et al. | |
| 2010/0150642 A1* | 6/2010 | Lee ......................... | B42F 13/18 402/24 |

FOREIGN PATENT DOCUMENTS

JP S60167655 A 8/1985

* cited by examiner

*Primary Examiner* — Paul D Kim
(74) *Attorney, Agent, or Firm* — GE Global Patent Operation; Rita D. Vacca

(57) ABSTRACT

A tool for assembly of an inner enclosure of a generator or a machine comprises a first part and a second part. The first part comprises a plate with one edge constructed to form a first half-ring. The second part comprises a second half-ring corresponding to the first half-ring of the first part. Upon assembly of the first part and the second part, the first half-ring and the second half-ring form a full-ring to encompass a shaft of the generator or the machine and to connect to an inner enclosure of the generator or the machine.

8 Claims, 6 Drawing Sheets

TOOL AND A METHOD FOR THE ASSEMBLY OF A GENERATOR

CROSS-REFERENCE TO RELATED APPLICATIONS

This application claims priority to European application 14160295.3 filed Mar. 17, 2014, the contents of which are hereby incorporated in its entirety.

TECHNICAL FIELD

The present disclosure relates to the technical field of tools for generators or machines and to methods for assembling parts to electrical generators or machines by means of tools.

The electric generator is in particular a rotating electric generator such as a synchronous generator to be connected to a gas or steam turbine (turbogenerator) or a synchronous generator to be connected to a hydro turbine (hydro generator) or an asynchronous generator or a synchronous or asynchronous electric motor, or also other types of electric machines. The invention refers to a generator or machine and especially to a certain part surrounding the end of the outer area of the shaft of the generator or machine, the inner enclosure.

BACKGROUND

Assembling an electric generator or machine for high or medium power is based on handling heavy weight parts to be connected in a precise and safe manner. Parts to be assembled are big in size and have a weight making it necessary to use cranes to move the several parts. Heavy weight cranes moving heavy parts in an assembly area are nevertheless a source of danger for persons and material. A certain part to be assembled is the so called inner enclosure which is a part surrounding the outer area at the end of the shaft of the generator or machine. When performing the assembly of the inner enclosure especially the rotor fan blade of the generator is endangered to damage. One prior art uses six prefabricated parts to be assembled to the single inner enclosure and accordingly six assembly processes to add all these parts. Next to the danger handling these parts the many fabrication steps are time consuming and expensive.

An object of the invention is to avoid the aforesaid problems in assembly procedures to assure a safe and precise assembly of parts for generators or machines.

SUMMARY

Provided is a tool for the assembly of a generator or machine according to claim 1. Further, a use of a tool and a method for assembling a generator or machine is provided according to claims 6 and 7, respectively.

In one example the tool is provided with holes through the plate fitting to corresponding holes at the inner enclosure for connecting the plate to the inner enclosure. By means of pins or bolts a secure connection between the plate and the inner enclosure is established. The inner enclosure together with the tool comprising the plate can then be assembled to the generator or machine.

In another example ribs are connected to the plate of the first part and/or to the half-ring of the second part projecting perpendicular from the corresponding first part or second part. The ribs mainly have a rectangular cross-section. The main function of the ribs is to stabilize the plate and the first part of the tool and to stiffen it.

In another example of the invention the plate of the first part has at least one cut-out. Advantage of this measure is that a reduced weight is achieved. Several cut-outs can be designed along the area of the plate with different shapes and sizes. Here, three round cut-outs are designed as an example.

In a further example of the invention the first part and the second part of the tool each have a connection plate at their ends to be joint and with which the first part and the second part are to be connected by screws to create a full-ring. The connection plates have bores, e.g. each connection plate has two bores through which the screws can project and be fixed by a screw nut each. By this measure the first part and the second part have a secure and detachable connection.

Furthermore, a method to assemble a generator or a machine with a tool according to the invention is provided.

BRIEF DESCRIPTION OF THE DRAWINGS

Further characteristics and advantages will be more apparent from the description of a preferred but non-exclusive embodiment of the tool, illustrated by way of non-limiting example in the accompanying drawings, in which.

DETAILED DESCRIPTION

Figure 1:
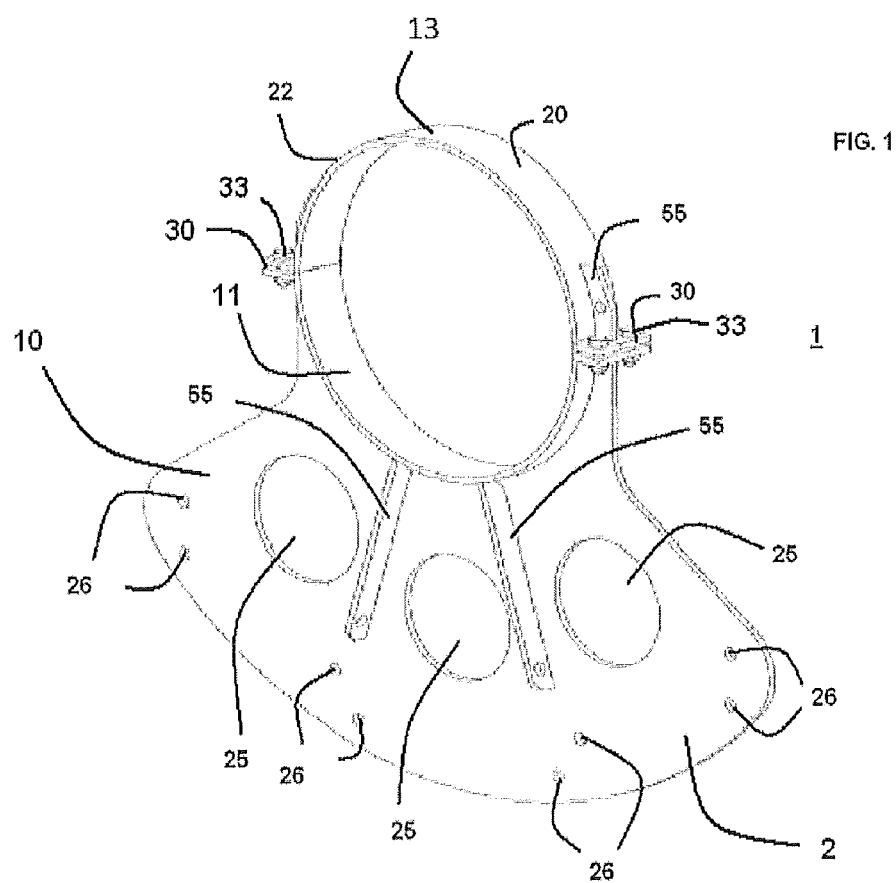
FIG. 1 is a schematic perspective view of a tool according to an example of the invention comprising a first part below having a plate with a first half-ring at the above side of the plate and a second part above having a second half-ring, the plate having three cut-outs, and the first part and the second part being connected.

With reference to the figures like reference numerals designate identical or corresponding parts throughout the several views.

FIG. 1 is a schematic perspective view of a tool 1 according to an example of the invention. Shown is a plate 2 comprised by a first part 10 of the tool 1 in this view below. The plate 2 of the first part 10 is cut at its above side in shape of a half-ring which is opened in the direction above in this perspective. At the edge of the first part 10 a curved face projects along the edge of the cut-out. The face has a certain width perpendicular to the plate 2 and has the shape of a half-ring, the face is denominated as first half-ring 11 in the following. In the example of FIG. 1 the plate 2 has three cut-outs 25 projecting completely through the plate 2. Ribs 55 are connected to the plate 2 starting from the first half-ring 11 and projecting with an angle to each other along the plate 2. A main function of the ribs 55 is to provide a stiffness to the plate 2. Further, plate 2 has several holes 26, in this example eight holes 26 distributed along the lower side of the plate 2 in this perspective, distant to the half-ring cut-out 25 and the first half-ring 11. The holes 26 serve as a means for establishing a connection to an inner enclosure 5, 6 as will be described below. The tool 1 comprises a second part 20 in the view above essentially comprising a second curved face formed as half-ring, in the following denominated as second half-ring 13. Regarding size and flection the second half-ring 13 is similar to the first half-ring 11. The first half-ring 11 and the second half-ring 13 each comprise connection plates 30 at each end, as shown in FIG. 1. The connection plates 30 are formed perpendicular to the end of the half-rings 11, 13 and have the same width as these. Connection plates 30 have plane faces to be joint in a way that the half-rings 11, 13 being assembled to form a full-ring 22. To the end of fixing together the half-rings 11, 13 in a force closure, bores are provided in the connection plates 30 for including screws 33 or bolts through the connection plates 30 of the half-rings 11, 13. Screw nuts are connected with the screws 33 to establish a removable connection between the first half-ring 11 and the second half-ring 13 of the tool 1. In FIG. 1 the second part 20 comprises two ribs 55 projecting from the two ends of the first half-ring 11 along a section of the second part 20. The first part 10 and the second part 20 create a full ring in FIG. 1, which serves for enclosing a shaft 41 of a generator 40 or machine 40.

Figure 2:
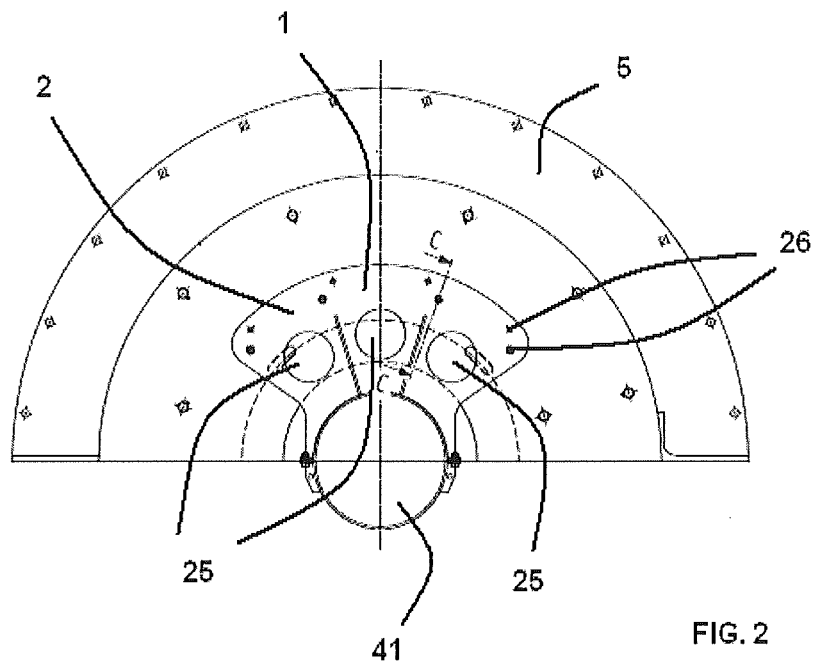
FIG. 2 is a draft of a schematic front view showing the tool connected to a first half of an inner enclosure to be assembled to a generator or machine.

FIG. 2 shows a draft of a schematic front view of the tool 1 connected to a part of an inner enclosure 5, 6. The inner enclosure 5, 6 is a part of the generator 40 or machine 40 at one end to essentially close the running parts of the generator 40 or machine 40 against the environment. The inner enclosure 5, 6 has a circular shape, in FIG. 2 one half of the inner enclosure 5 is shown. The second half of the inner enclosure 6 is to be assembled as will be described below. Here, the tool 1 is put onto the shaft 41 and the first part 10 and the second part 20 of the tool 1 are assembled to a full-ring similar to FIG. 1 and described above.

Figure 3:
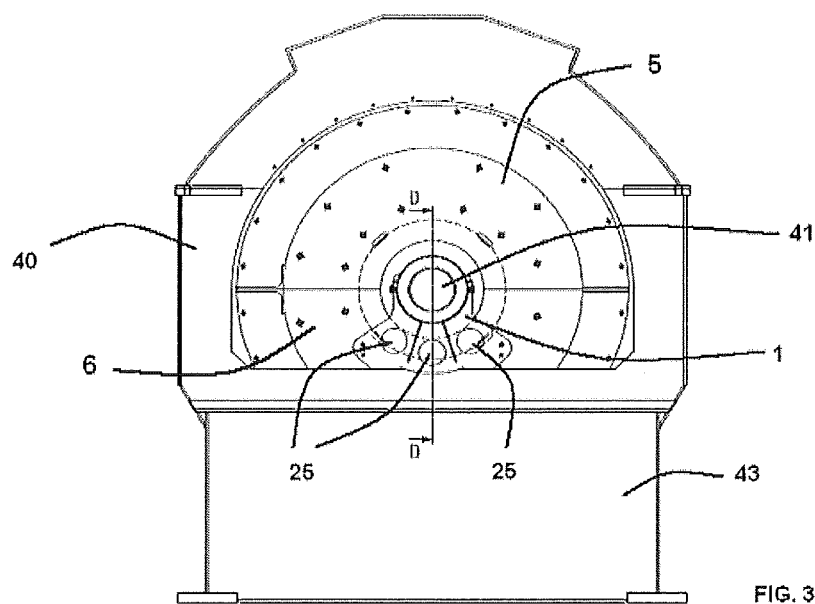
FIG. 3 is a draft of a schematic front view similar to FIG. 2, the inner enclosure assembled to the generator or machine, and showing the tool moved to the downside.

FIG. 3 shows a draft of a schematic front view similar to FIG. 2. Here, the second half of the inner enclosure 6 is assembled to the full inner enclosure 5, 6. In this front view the generator 40 or machine 40 is put onto the support 43, the inner enclosure 5, 6 fills most of the open area in the axial direction of the generator 40 or machine 40 and thus in the direction of the shaft 41. It is visible in FIG. 3 that the tool 1 is turned down, the first part 10 of the tool 1 is directed to the bottom. This is due to the assembling process in which the tool 1 with the first half of the inner enclosure 5 is turned to the other side of the shaft 41 to enable the assembly of the second half of the inner enclosure 6 as is described below.

Figure 4:
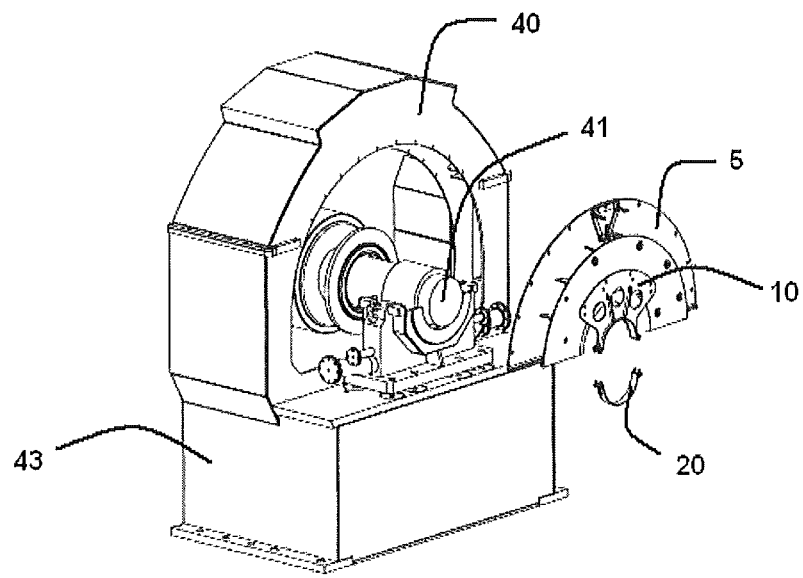
FIGS. 4-10 show perspective schematic views of a generator or machine in subsequent phases of the assembly procedure to assemble the inner enclosure to the generator or machine by means of the tool.

FIG. 4 shows a perspective schematic view of a generator 40 or machine 40 in a first phase of the assembly procedure to assemble the inner enclosure 5, 6 to the generator 40 or machine 40 by means of the tool 1. The generator 40 or machine 40 rests on a support 43, commonly fixed to the ground of a generator hall. In this first method step the first part 10 of the tool 1 is releasably connected to the first half of the inner enclosure 5 by means of pins or bolts reaching through the holes 26 in the plate 2 of the first part of the tool 10. Also shown in FIG. 4 is the second half of the inner enclosure 6 below the first part of the tool 10 connected to the first half of the inner enclosure 5.

Figure 5:
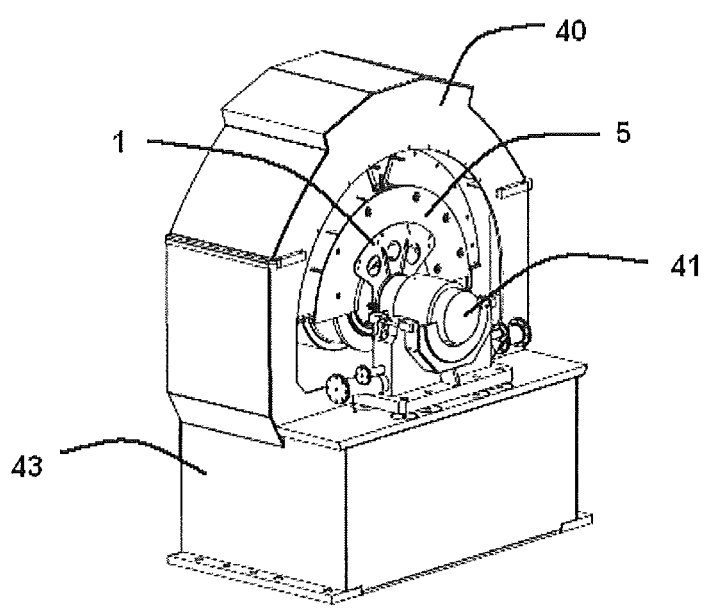

FIG. 5 shows a second step of manufacturing of the inner enclosure 5, 6 to the generator 40 or machine 40. Here, the first part 10 of the tool 1 releasably connected to the first half of the inner enclosure 5 is assembled to the shaft 41 of the generator 40 or machine 40. The first part 10 and the second part 20 of the tool are bolt together to encompass the shaft 41. The half-ring 11 of the first part 10 of the tool 1 abuts the shaft 41, there is a gap between the first half 5 of the inner enclosure 5, 6 and the shaft 41. In this view the plate 2 and the first half 5 of the inner enclosure 5, 6 are directed upwards. The two parts, the tool 1 and the first half 5 of the inner enclosure 5, 6 are typically mounted to the generator 40 or machine 40 by a crane.

Figure 6:
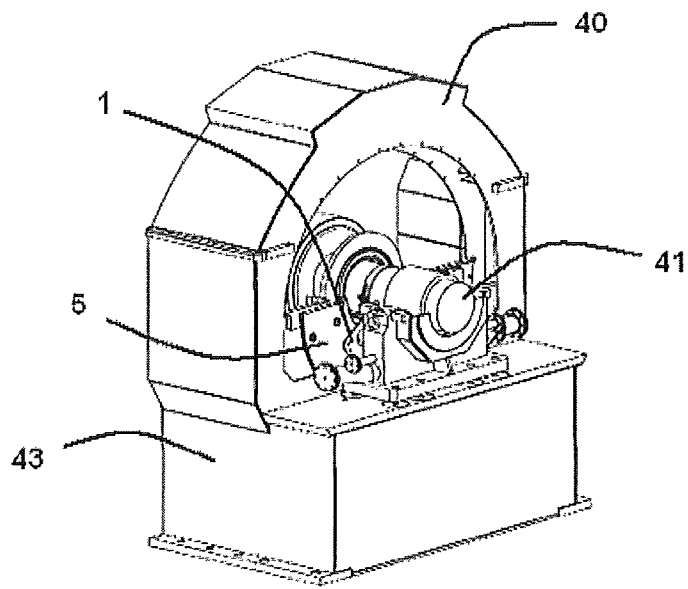

FIG. 6 shows a third step of the method to assemble the inner enclosure 5, 6 to the generator 40 or machine 40. Hereby, the first half 5 of the inner enclosure 5, 6 as well as the connected tool 1 are turned by around 180° a half turn around the shaft 41 by turning the plate 2. This means, the plate 2 and the first half 5 of the inner enclosure 5, 6 are directed to the bottom now. The upper part of the housing of the generator 40 or machine 40 is open in this position in an axial direction, the lower part of the housing is closed by the first half 5 of the inner enclosure 5, 6.

Figure 7:
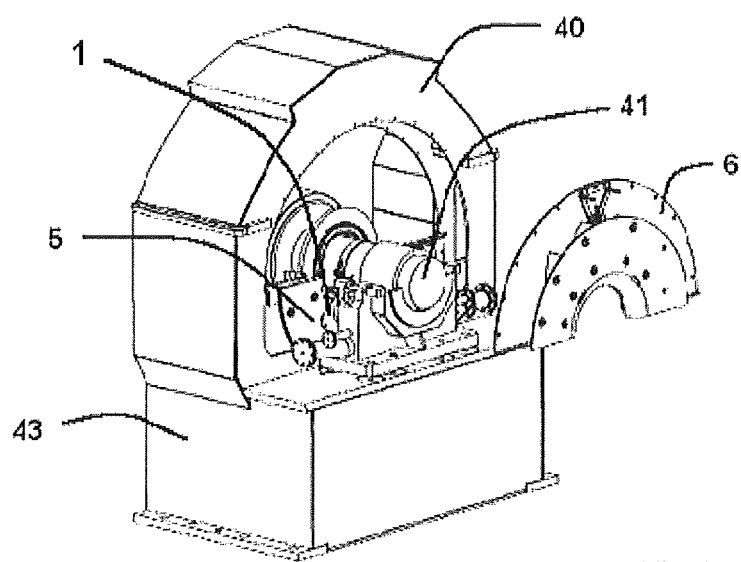
Figure 8:
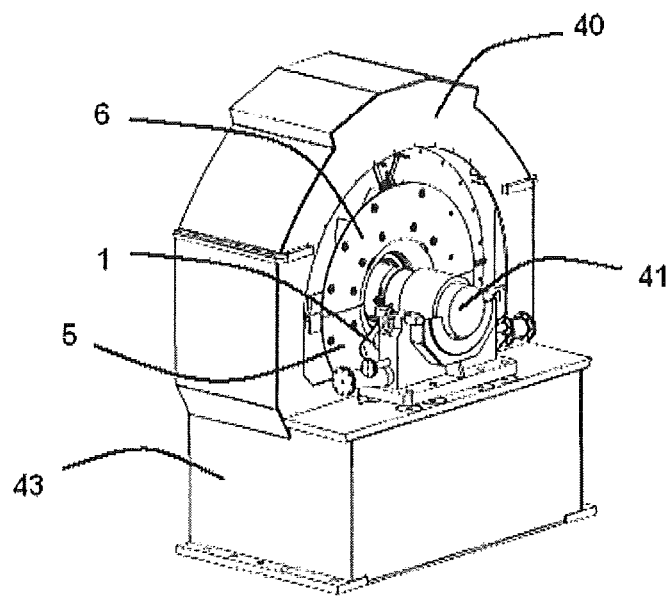

FIG. 7 shows a fourth step of the fabrication method by means of the tool 1. In this step a second half 6 of the inner enclosure 5, 6 is carried to the generator 40 or machine 40 according to FIG. 6. This is usually done by a crane because of the high weight of the parts involved in medium or high power generators 40 or machines 40. The second half 6 of the inner enclosure 5, 6 is attached flush with the first half 5, so the two parts constitute a full circle or full-ring 22, which is the complete inner enclosure 5, 6. It is to be understood that in an example of the invention the inner enclosure 5, 6 is prefabricated out of the first half 5 and the second half 6. The fabrication step is shown in FIG. 8, at which the two halves 5, 6 are connected to each other in a common way. At this step the inner enclosure 5, 6 is completely assembled with the generator 40 or machine 40. The inner enclosure 5, 6 is assembled supported by the tool 1 as described. The tool 1 arranges for a secure introduction, a smooth adjustment of the two halves 5, 6 of the inner enclosure 5, 6 and an improved manufacturing process. In this assembled condition the clearance between heavy fan blades of the rotor of the generator 40 and the inner enclosure 5 is about 2-3 mm.

Figure 9:
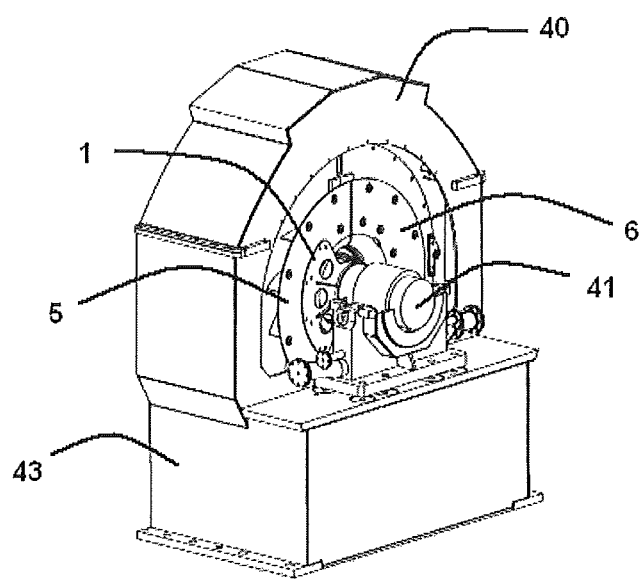
Figure 10:
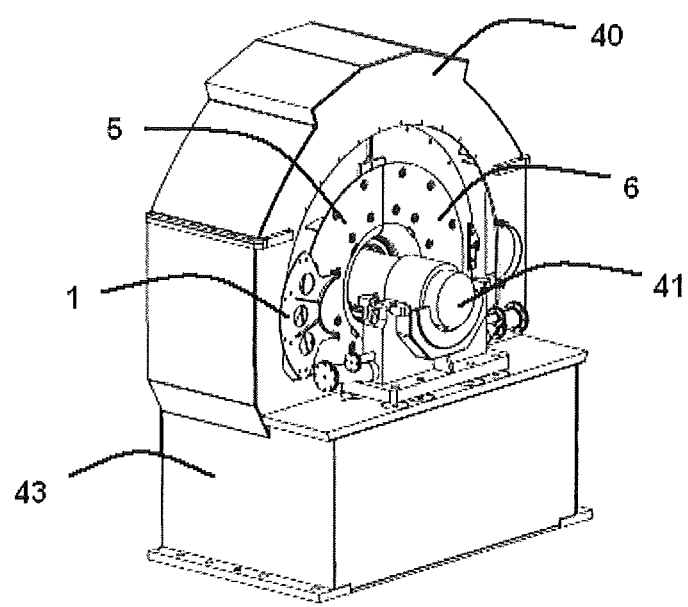

FIG. 9 shows a sixth step of the manufacturing method using the tool 1. The tool 1 is turned by an angle of around 45°, so the plate 2 is directed to a side of the generator 40 or machine 40. The tool 1 is divided into its first part 10 and second part 20 by loosening the screws 33 and removing the parts 10, 20.

Modifications and variants in addition to those already stated are possible.

The tool and the method conceived in this manner are susceptible to numerous modifications and variants, all falling within the scope of the inventive concept; moreover all details can be replaced by technically equivalent elements.

The invention claimed is:

1. A tool for assembling an inner enclosure located at one axial end of a generator or a machine to protect moving parts of the generator or machine, the tool comprising:
    a first part comprising a plate surrounded by edges with a first edge of the plate of a concave half-ring shape, and a first curved face extending perpendicular with respect to the plate fixed along the first edge to form a first half-ring shape; and
    a second part comprising a second curved face of a second half-ring shape corresponding to the first curved face of the first half-ring shape of the first part, the first curved face and the second curved face sized for assembly to form a full-ring to encompass a shaft of the generator or the machine and to be releasably fixed to the inner enclosure for a maintenance operation.

2. The tool according to claim 1, further comprising plate holes extending through the plate, with the plate holes corresponding to holes in the inner enclosure, wherein the plate holes and the holes in the inner enclosure are used for connecting the plate to the inner enclosure.

3. The tool according to claim 1, further comprising ribs connected to the plate of the first part, and ribs connected to the second curved face of the second part, the ribs projecting perpendicular with respect to the plate of the first part and the ribs on the second part projecting parallel with respect the plate of the first part of the tool.

4. The tool according to claim 1, further comprising at least one cut-out through the plate of the first part.

5. The tool according to claim 1, wherein the first part and the second part of the tool each comprise connection plates, with one of the connection plates at each end of the first curved face and one of the connection plates at each end of the second curved face for jointed connection of the first part and the second part by screws through the connection plates to create the full-ring.

6. A use of the tool according to claim 1 to assemble a part of the generator or the machine.

7. A method to assemble an inner enclosure of a generator or a machine, the method comprising:
  connecting a first part of a tool to a first half of the inner enclosure of the generator or the machine, with the first part of the tool comprising a plate surrounded by edges with a first edge of the plate of a concave half-ring shape, and a first curved face extending perpendicular with respect to the plate fixed along the first edge to form a first half-ring shape;
  enclosing a shaft of the generator or the machine with the first part of the tool and a second part of the tool, with the second part of the tool comprising a second curved face of a second half-ring shape;
  forming a full-ring by connecting with the first part and the second part;
  attaching a second half of the inner enclosure to the first half of the inner enclosure; and
  removing the tool.

8. The method according to claim 7, further comprising:
  turning the tool connected to the first half of the inner enclosure to position the first half of the inner enclosure at a bottom of the generator or the machine;
  after turning the tool, then the attaching of the second half of the inner enclosure to the first half of the inner enclosure to position the second half of the inner enclosure at a top of the generator or the machine; and
  after the attaching of the second half, then turning the tool a quarter of a circle to one side prior to the removing of the tool.

* * * * *